March 27, 1956   R. L. BOWERS ET AL   2,739,681
DRIVE AND CONTROL MECHANISM FOR A WINDSHIELD WIPER
Filed May 4, 1951   4 Sheets-Sheet 1

Inventors
Roy L. Bowers and Carleton J. Lauer
By Willits Hardman and Fehr
their Attorneys

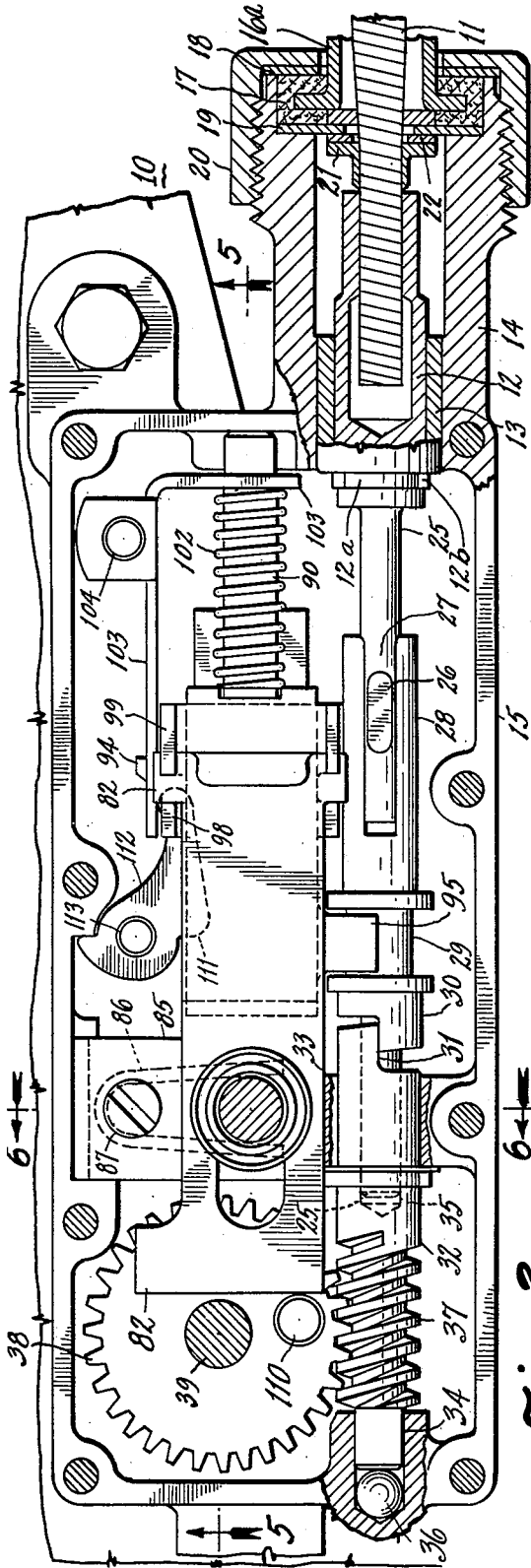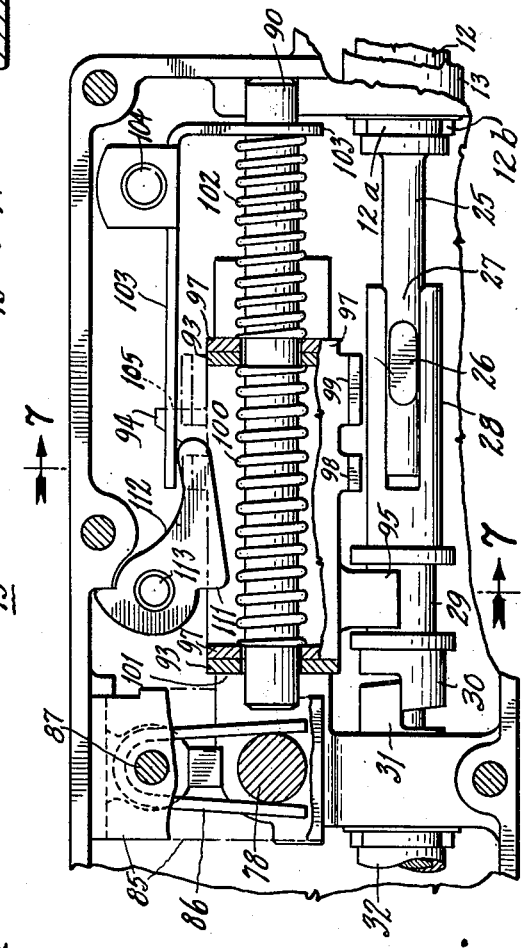

March 27, 1956  R. L. BOWERS ET AL  2,739,681
DRIVE AND CONTROL MECHANISM FOR A WINDSHIELD WIPER
Filed May 4, 1951  4 Sheets-Sheet 3

Inventors
Roy L. Bowers and Carleton J. Lauer
By Willits, Hardman and Fehr
their Attorneys March 27, 1956  R. L. BOWERS ET AL  2,739,681
DRIVE AND CONTROL MECHANISM FOR A WINDSHIELD WIPER
Filed May 4, 1951  4 Sheets-Sheet 4

Inventors
Roy L. Bowers and Carleton J. Lauer
By Willits Hardman and Fehr
their Attorneys United States Patent Office 2,739,681
Patented Mar. 27, 1956

2,739,681
DRIVE AND CONTROL MECHANISM FOR A WINDSHIELD WIPER

Roy L. Bowers, Flint, and Carleton J. Lauer, Fenton, Mich., assignors to General Motors Corporation, Detroit, Mich., a corporation of Delaware Application May 4, 1951, Serial No. 224,626

5 Claims. (Cl. 192—33)

This invention relates to windshield wipers and its object is to provide a wiper operating mechanism which is driven by an external power source such as the vehicle propelling engine. In the disclosed embodiment thereof, the present invention provides a wiper blade oscillating mechanism connected with the driven member of a clutch whose driving member is connectible by a flexible shaft with a rotary element driven by the power source such as the shaft of the generator driven by the engine. The engagement and disengagement of the clutch is under a manual control. Clutch disengagement at the end of a wiping stroke is effected automatically by a clutch control mechanism which, as the blades approach the end of a wiping stroke, is power operated to cock a spring which at the end of a wiping stroke is released quickly to disengage the clutch members; and a second spring is cocked preparatory to effect engagement of the clutch members. The manual control conditions the mechanism for disengagement of the clutch members by the first spring and for engagement of the clutch members by second spring.

A further object of the invention is to provide a unitary structure which includes the wiper blade, oscillating mechanism, the clutch, the clutch control mechanism and the manual control, said structure being easily mountable upon a vehicle and easily connectible with a mechanical power source by a flexible shaft.

Further objects and advantages of the present invention will be apparent from the following description, reference being had to the accompanying drawings wherein a preferred embodiment of the present invention is clearly shown.

In the drawings:

Fig. 3 is a sectional view on line 3—3 of Fig. 2.

Fig. 4 is a view showing a part of Fig. 3 with certain members of the unit broken away.

Figure 1:
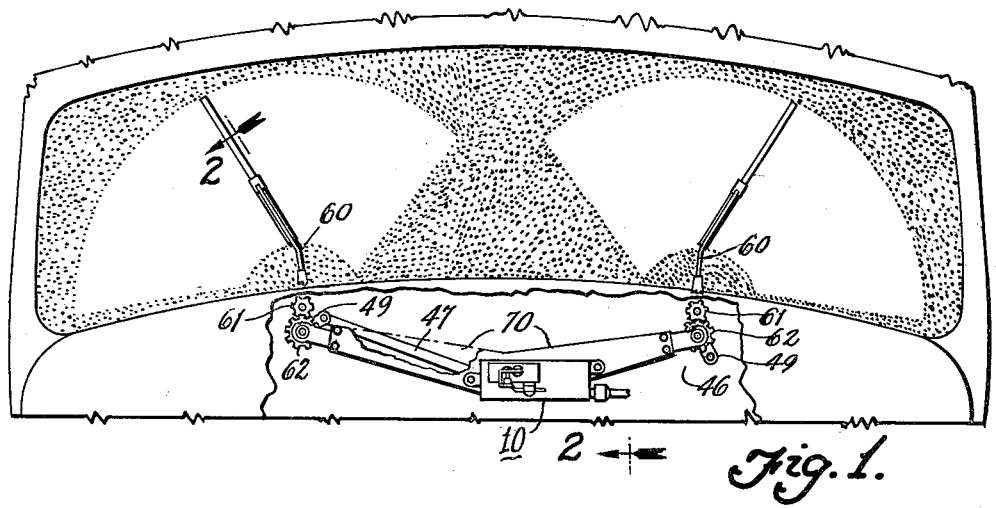
Fig. 1 is a view in the direction of arrows 1 of Fig. 2 and it shows the front view of the wiper unit mounted upon a vehicle.
Figure 2:
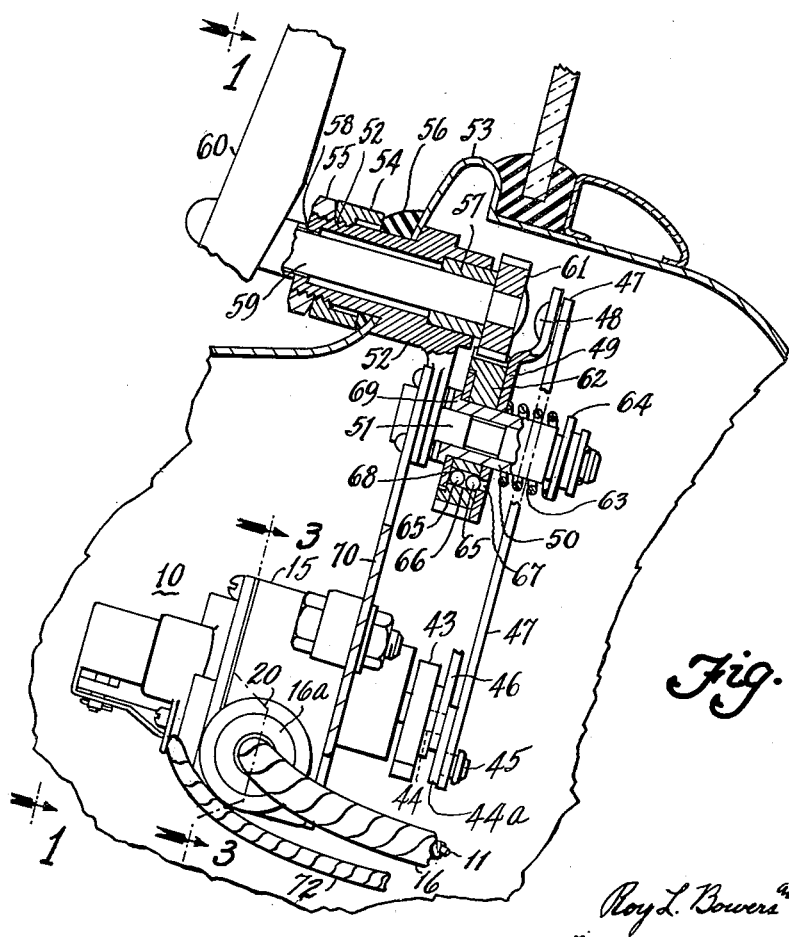
Fig. 2 is a sectional view of the wiper unit taken generally in the planes indicated by arrows 2 of Fig. 1

The wiper operating unit 10 is connectible with an engine driven shaft, such as the shaft of a generator driven by the engine, by a flexible shaft 11 (Figs. 2 and 3) whose squared end engages the hollow square of coupling 12, which engagement transmits rotational motion, but also permits longitudinal adjustment to compensate for manufacturing tolerances in the length of the flexible shaft. Coupling 12 is journaled in a bearing 13 pressed in the tubular part 14 of a housing 15. Shaft 11 rotates within a flexible, protective casing 16 (Fig. 2) which retains shaft lubricant. This casing terminates in flanges 16a, one of which is shown in Figs. 2 and 3. Flange 16a is embedded in a non-metallic grommet 17 located between washers 18 and 19 which are retained in housing part 14 by a nut 20. The end of shaft 11 is axially fixed relative to housing part 14 by a collar 21 staked to the shaft and bearing against a thrust washer 22 which engages washer 19. The end of the shaft 11 which is not shown is connected in a similar manner to an engine driven shaft and the end of the casing 16 which is not shown is attached in a similar manner to the housing which supports the engine driven shaft.

Shaft 25 containing key 26 is an extension of and is integral with shaft 12; it has at one end the hollow square to receive the flexible shaft, the opposite end is piloted in the worm shaft 32. The clutch 28 is carried on extension 25, and is free to slide in and out of engagement with jaw 31 but remains in rotational engagement with shaft 25, by means of key 26. Shaft 12 is journaled in bearing 13 and pilot hole 35 in worm shaft 32. Shaft 12 is also provided with a square recess groove 12a to receive a snap ring 12b for the purpose of retaining the shaft within the housing and thereby preventing its withdrawal when the flexible shaft assembly is removed. The left end of shaft 32 engages a ball 36 which receives the end thrust due to the driving engagement between a worm 37 provided by shaft 32 with a worm gear 38 connected with a shaft 39 which, as shown in Fig. 5, is journaled in a bearing 40 provided by housing 15 and in a bearing 41 provided by a housing cover 42.

Figure 5:
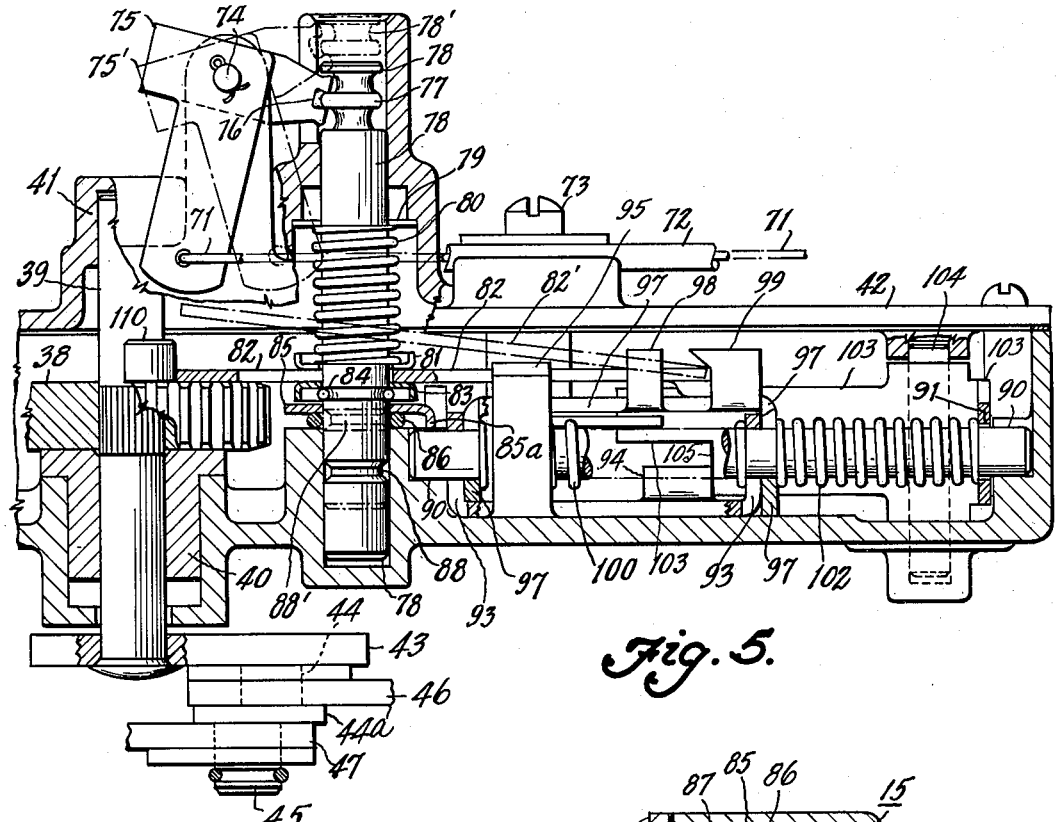
Fig. 5 is a sectional view taken generally in the planes indicated by arrows 5 of Fig. 3.
Figures 6, 7:
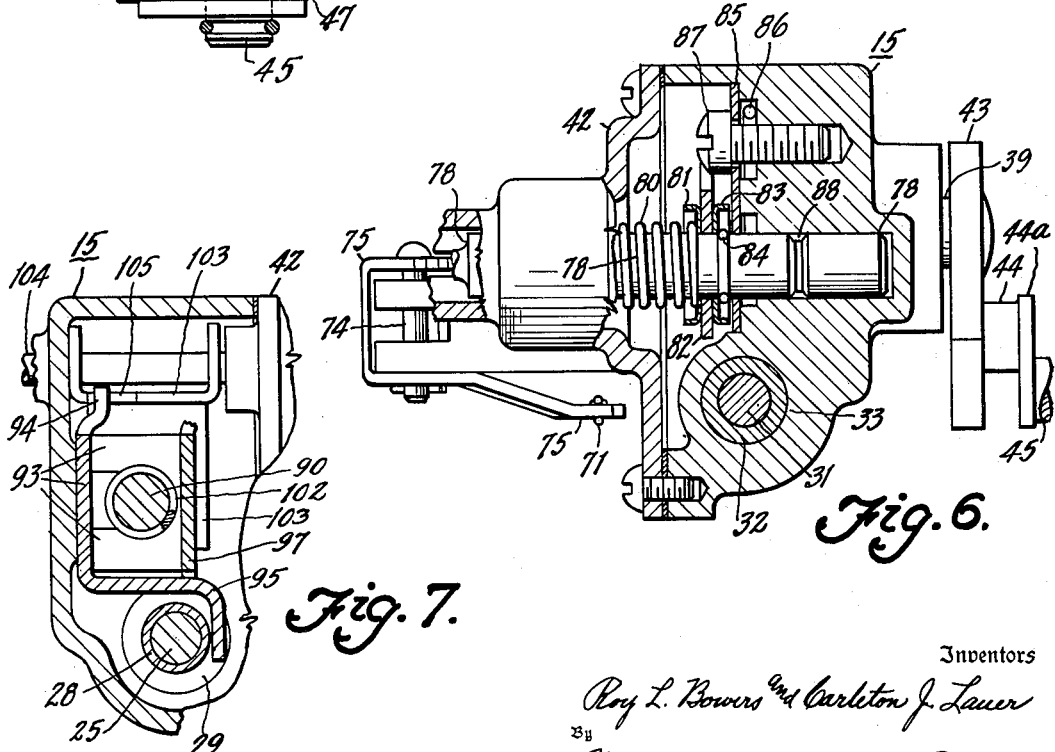
Fig. 6 is a sectional view in the plane indicated by arrows 6 of Fig. 3.
Fig. 7 is a sectional view in the plane indicated by arrows 7 of Fig. 4.

Referring to Figs. 2 and 5, shaft 39 is attached to a lever 43 which carries a crank pin 44 which supports a disc 44a which supports a crank pin 45. Crank pins 44 and 45 are displaced by a predetermined amount to compensate for the angular relation between unit 10, and the left-hand stud 51, and the right-hand stud 51. This angular relation is dictated by the design of the windshield and cowl, and predetermined compensation must be included to assure that the wiper blades are in exact opposite phase and will arrive at the parking position at the same instant. Pins 44 and 45 are pivotally connected respectively with links 46 and 47. Link 47 is connected by stud 48 with a lever 49 journalled on a bushing 50 supported by a stud 51 attached to a bracket 52 which extends through a hole in cowl 53 and is secured thereto by a nut 55 which retains an escutcheon plate 54 and a rubber grommet 56. Shaft 59 to which a wiper arm 60 is attached is supported by a bearing 57 at rear end and by a bearing 58 having a smaller outside diameter pressed down into the forward end of bracket 52. Shaft 59 is connected with a gear 61 meshing with a gear 62 journalled on bushing 50 and connected with lever 49 by a torque limiting clutch which includes a spring 63, retained by a C-washer 64, which urges lever 49 toward gear 62 so that one of the two balls 65 retained in each of three pockets 66 of the gear 62 will be received by a hole 67 of the lever 49 while the other ball 65 is retained by a washer 68 retained by the flange 69 of bushing 50. The gear ratio of gear 62 to gear 61 is a multiplying ratio which permits wide angle of wipe with relatively small angular motion of lever 49, thus avoiding the approach of dead center condition of lever 49.

The connection between link 46 and the other wiper arm not shown in Fig. 2 is like the connection between link 47 and arm 60. The two brackets 52 which support the wiper arm shafts 59 support a plate 70 which supports the housing 15 of the mechanism unit 10. The right and left-hand wiper shaft assemblies are identical with the exception that gears 62 are meshed at different points for the purpose of imparting opposite but complementary angular motion to the left and right-hand wiper blades.

The clutch 30, 31 (Fig. 3) is controlled by a push knob (not shown) connected with a Bowden wire 71 (Fig. 5) contained in a bendable tube 72 having each end fixed. A screw 73 attaches one end of tube 72 to cover 42. Cover 42 supports a pin 74 which pivotally supports a lever 75 to which wire 71 is attached. Lever 75 has a notch 76 which receives an annular boss 77 of a rod 78 guided for longitudinal movement by housing 15 and cover 42. Rod 78 extends through a washer 79, a spring 80, a washer 81, a plate 82, a washer 83, a snap ring 84, a plate 85 and between the ends of a spring 86 which are biased against rod 78. Spring 86 is secured by a screw 87 (Fig. 3) which secures plate 85. Spring 80 urges washer 81 against plate 82. Lever 75 is in dot-dash line position 75' and rod 78 is in dot-dash line position 78' when the wiper is operating. Rod 78 is maintained in this position by spring 86 whose ends are received by a groove 88 (at 88' in Fig. 5) of rod 78. Plate 82 is then at position 82'.

Figure 9:
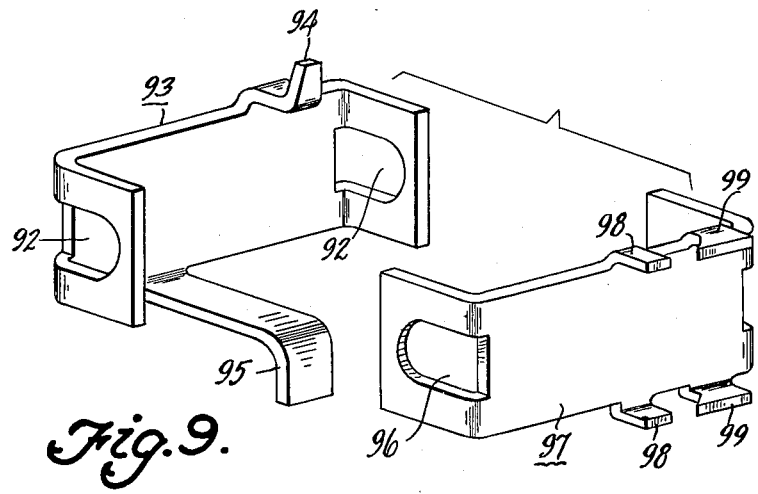
Fig. 9 is a perspective view of a disassembly of parts 93 and 97.

Rod 90 (Fig. 5) is secured to housing 15 by a flange 85a turned down on plate 85 to contact rod 90 at one end and by the elongated hole 91 in lever 103. Rod 90 passes through holes 92 in ears (Fig. 9) of a U-plate 93 providing a stop lug 94 and an arm 95, and through holes 96 in ears of a U-plate 97 providing guide ears 98 and fulcrum ears 99. As shown in Fig. 4, a spring 100 surrounding rod 90 urges an ear of plate 93 to the right against an ear of plate 97 and urges an ear of plate 97 to the left against an ear of plate 93. The plates 93 and 97 are urged left against a stop 101 by a spring 102 surrounding rod 90; and spring 102 urges counterclockwise a lever 103 pivoted on a stud 104 supported by housing 15. In the position of lever 103 shown in Fig. 4, it presents a stop surface 105 adjacent to stop 94 of plate 93.

Figure 8:
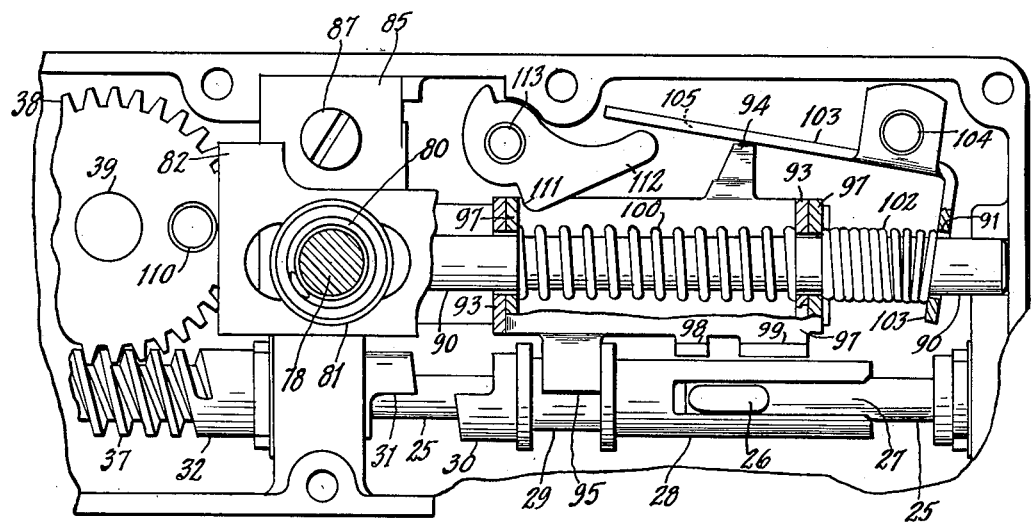
Fig. 8 is a view of a part of Fig. 4 showing certain members in other positions.

The ears 98 of plate 97 guide plate 82 which is pivotally supported by fulcrum ears 98 of plate 97. When plate 82 is moved down from its position 82' in consequence of downward movement (Fig. 5) of rod 78 from its position 78', the left end of plate 82 is located in the path of movement of a stud 110 carried by gear 38. As the wiper blades approach the end of a wiping stoke and the parking position of the blades, stud 110 engages plate 82 to move plates 93 and 97 to the right against the action of spring 102. These plates move together until stop 94 of plate 93 engages stop 105 of lever 103. Then right movement of plate 93 is temporarily arrested. Movement of plate 97 continues independently of plate 93 while spring 100 is additionally compressed; and plate 97 engages a surface 111 of a lever 112 pivoted on a stud 113 supported by housing 15. Lever 112 is moved counterclockwise and it moves lever 103 clockwise to lift surface 105 above stop 94 of lever 93 as shown in Fig. 8. Then spring 100 is released quickly to effect right movement of plate 93 and its arm 95 which, by virtue of its location in groove 29 of driving clutch member 30, causes the latter to retract from engagement with driven clutch member 31. Therefore the mechanism connecting the driven clutch member 31 with the wiper arms ceases operation. Spring 100 is cocked by operation of the power source through shaft 11 to effect quick disengagement of the clutch members which takes place almost instantly when the wiper blades arrive at parking positions.

If the knob should be pushed in to effect downward movement of rod 78 at a time when stud 110 (Fig. 5) is under plate 82, spring 80 is additionally compressed until stud 110 clears the plate 82. At that instant spring 80 is released quickly to move plate 82 into horizontal position in the path of movement of stud 110.

The operation of the clutch control mechanism to disengage the clutch is accompanied by the additional compression or cocking of spring 102 as shown in Fig. 8. Following the lifting of surface 105 of lever 103 above the stop 94 of plate 93 by the action of lever 112, spring 100 moves plate 93 right to cause stop 94 to engage the underside of lever 103 to press spring 102 toward the left while spring 100 presses toward the right upon spring 102. Then spring 102 is cocked preparatory to its release to effect clutch engagement. Spring 102 is cocked by force derived from the source of mechanical power and is held cocked by the engagement of stud 110 with plate 82, stud 110 being retained against the action of spring 102 by virtue of the non-reversible gearing provided by worm gear 38 and worm 37.

When the knob attached to wire 71 (Fig. 5) is pulled, lever 75 is moved to position 75', rod 78 moves to position 78', plate 82 moves to position 82', spring 102 is released to effect reengagement of the clutch parts 30 and 31 and restoration of the clutch controlling parts to the positions shown in Figs. 3, 4 and 5.

From the foregoing description of the construction and mode of operation thereof, it is apparent that the present invention provides a unitary structure comprising a wiper blade oscillating mechanism, a clutch having a driving member connected with the oscillating mechanism and having a driving member, means for connecting the driving member with a source of mechanical power, a clutch control mechanism and a manual control for conditioning the clutch control mechanism for clutch disengagement or clutch engagement. The clutch control mechanism includes a movable, clutch-disengaging and clutch-engaging member and devices energized in consequence of actuation of the oscillating mechanism for effecting movements of said member respectively for clutch-disengagement and clutch engagement. As disclosed, one of the devices is a spring, which, when the clutch control mechanism is conditioned by the manual control for clutch disengagement, is cocked by power operation and then is automatically released at the end of a wiping stroke quickly to disengage the clutch; and the other device is a second spring which is cocked in consequence of power operation preparatory to its release to effect clutch engagement when the clutch control mechanism is conditioned by the manual control for clutch engagement.

While the embodiment of the present invention as herein disclosed, constitutes a preferred form, it is to be understood that other forms might be adopted.

What is claimed is as follows:

1. In combination, an oscillating mechanism, a clutch having a driven member connected with the oscillating mechanism and having a driving member, means for connecting the driving member with a source of mechanical power, a clutch control mechanism having a movable, clutch-engaging and clutch-disengaging member mounted adjacent said clutch, a first spring for moving the member into clutch-disengaging position, means for transmitting motion to the first spring from the oscillating mechanism to cock the first spring preparatory to its movement of the last mentioned member, means responding to a certain movement of the motion transmitting means for releasing said first spring, and a second spring for moving the last mentioned member into clutch engaging position and cocked in consequence of said operation of the motion transmitting means and a manual control for conditioning the motion transmitting means for said operation when clutch disengagement is desired and for conditioning the motion transmitting means for release of the second spring when clutch engagement is desired.

2. In combination, an oscillating mechanism, a clutch having a driven member connected with the oscillating mechanism and having a driving member, means for connecting the driving member with a source of mechanical power, a clutch control mechanism having a movable, clutch-engaging and clutch-disengaging first member; a first spring for moving the member into clutch-disengaging position, means for transmitting motion to the first spring from the oscillating mechanism to cock the first spring preparatory to its movement of the member, said means including a second member for stressing the first spring, a lever fulcrumed on the second member, a pin orbitally moved by the oscillating mechanism for engaging the free end of the lever, manually controlled means for moving the free end of the lever from a position out of, into a position in the path of movement of the pin whereby, as the pin moves the lever, the second member is moved to stress the first spring, a latch engaging the first member to prevent movement thereof while the first spring is being stressed, means operating by movement of the second member after it has stressed the first spring for retracting the latch to free the first member so that the first spring will move it into clutch disengaging position, a second spring confined between the second member and the latch and urging the latch toward latching position and a part extending from the first member when in clutch disengaging position for retaining the latch in releasing position, said second spring being additionally stressed, upon release of the first spring, preparatory to return of the first member to clutch engaging position by the second member when the free end of the lever is retracted from the pin.

3. In combination, an oscillating mechanism, a clutch having a driven member connected with the oscillating mechanism and having a driving member, means for connecting the driving member with a source of mechanical power, a clutch control mechanism which includes a fixed guide-rod parallel to the clutch members, first and second plates supported by the rod and each having two spaced ears through which the rod extends, the ears of the second plate being normally adjacent to that side of the ears of the first plate which corresponds to the direction of clutch disengaging movement of one of the clutch members, a first compression spring surrounding the rod and confined between an ear of each plate so that the ears of the second plate are normally close to ears of the first plate, a second compression spring and surrounding the rod for urging the second plate and hence the first plate into a position for effecting clutch engagement, said first plate having a part for transmitting clutch-engaging or clutch disengaging movement to one of the clutch members, a lever fulcrumed on the second plate, a pin orbitally moved by the oscillating mechanism for engaging the free end of the lever, manually controlled means for moving the free end of the lever from a position out of, into a position in the path of movement of the pin whereby, as the pin moves the lever, the second plate moves in the clutch-disengaging direction of movement of the first plate, a second or latch lever normally engaging the first plate to prevent clutch disengaging movement thereof while the second plate is moved by the pin and the first lever to compress the first spring, a third or latch releasing lever actuated by the second member when actuated by the pin to a certain position to engage the latch lever to release it, whereby the first spring expands to move the first plate to disengage the clutch, and means provided by the first plate for holding the latch lever in retracted position, said second spring being under compression by virtue of said pin actuated movement of the second plate and urging the latch lever toward position for retaining the first plate.

4. In combination, a rotatable driving member having an annular groove, a rotatable driven member, means including a clutch for drivingly interconnecting said members, a clutch control mechanism having a reciprocable clutch engaging and clutch disengaging member, said last mentioned member having an arm disposed in the groove of said driving member whereby said driving member is free to rotate relative to said last mentioned member but constrained for movement with said last mentioned member during reciprocation thereof, oppositely acting resilient means for effecting clutch engaging and clutch disengaging movement of said last mentioned member, means engageable with said driven member and operable thereby for stressing said oppositely acting resilient means, and a manual control for moving said last recited means into and out of engagement with said driven member to control disengagement and engagement of said clutch.

5. In combination, a rotatable driving member, a rotatable driven member, means including a clutch for drivingly interconnecting said members, a pivotally supported element movable into and out of engagement with said driven member and movable thereby, a reciprocable clutch controlling member operatively connected with said rotatable driving member such that said driving member is free to rotate relative to said clutch controlling member but constrained for reciprocable movement therewith, first resilient means engageable with said clutch controlling member for effecting clutch disengaging movement thereof, second resilient means engageable with said clutch controlling member and acting in opposition to said first resilient means for effecting clutch engaging movement thereof, means interconnecting said first and second resilient means with said element whereby movement of said element by said driven member stresses said first and second resilient means, means actuated by movement of said element by said driven member to a predetermined position for releasing said first resilient means to effect clutch disengaging movement of said clutch controlling member, and manual means for effecting pivotal movement of said element into engagement with said driven member to cause disengagement of said clutch and out of engagement with said driven member to effect a release of said second resilient means and cause engagement of said clutch.

References Cited in the file of this patent

UNITED STATES PATENTS

| | | |
|---|---|---|
| 1,077,886 | Marsh | Nov. 4, 1913 |
| 2,046,171 | Lauer | June 30, 1936 |
| 2,079,573 | Lauer | May 4, 1937 |
| 2,243,042 | Stahl | May 20, 1941 |
| 2,253,711 | Kearns | Aug. 26, 1941 |
| 2,259,790 | Auten | Oct. 21, 1941 |